United States Patent
Ballet et al.

(10) Patent No.: US 10,459,253 B2
(45) Date of Patent: Oct. 29, 2019

(54) OPHTHALMIC DEVICE COMPRISING AN ELECTROCHROMIC CELL

(71) Applicant: Essilor International, Charenton le Pont (FR)

(72) Inventors: Jerome Ballet, Charenton le Pont (FR); Samuel Archambeau, Charenton le Pont (FR); Jean-Paul Cano, Charenton le Pont (FR); Claudine Biver, Charenton le Pont (FR); Sylvie Vinsonneau, Charenton le Pont (FR); David Escaich, Charenton le Pont (FR); Stephane Perrot, Charenton le Pont (FR); Fabien Berit Debat, Charenton le Pont (FR); Jean-Jacques Lussagnet, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 0 days.

(21) Appl. No.: 15/742,637

(22) PCT Filed: Jul. 8, 2016

(86) PCT No.: PCT/FR2016/051765
§ 371 (c)(1),
(2) Date: Jan. 8, 2018

(87) PCT Pub. No.: WO2017/009563
PCT Pub. Date: Jan. 19, 2017

(65) Prior Publication Data
US 2018/0196283 A1 Jul. 12, 2018

(30) Foreign Application Priority Data
Jul. 10, 2015 (FR) ...................... 15 56626

(51) Int. Cl.
*G02C 7/10* (2006.01)
*G02F 1/161* (2006.01)
(Continued)

(52) U.S. Cl.
CPC ............. *G02C 7/101* (2013.01); *G02F 1/161* (2013.01); *G02F 1/153* (2013.01); *G02F 1/163* (2013.01)

(58) Field of Classification Search
CPC ......... G02C 7/101; G02F 1/161; G02F 1/163; G02F 1/153
(Continued)

(56) References Cited

U.S. PATENT DOCUMENTS 5,790,298 A    8/1998   Tonar
9,091,868 B2 *   7/2015   Bergh .................. G02F 1/0121
(Continued)

FOREIGN PATENT DOCUMENTS

EP     2 848 669 A1    3/2015

OTHER PUBLICATIONS

International Search Report dated Oct. 21, 2016 in PCT/FR2016/051765 filed Jul. 8, 2016.

*Primary Examiner* — Tuyen Tra
(74) *Attorney, Agent, or Firm* — Oblon, McClelland, Maier & Neustadt, L.L.P.

(57) ABSTRACT

The invention relates to an ophthalmic device (1) which includes an electrochromic cell (3) comprising at least two transparent layers (4, 5) having curved inner surfaces (4a, 5a) and defining therebetween a closed recess (6) filled with an electrochromic composition (7), the recess (6) being defined peripherally by a sealing gasket (11) made from an adhesive material (20), the sealing gasket (11) being suitable for keeping the two transparent layers (4, 5) assembled together.

15 Claims, 3 Drawing Sheets

(51) Int. Cl.
*G02F 1/153* (2006.01)
*G02F 1/163* (2006.01)

(58) Field of Classification Search
USPC ............ 359/265–275, 900; 345/105; 351/41, 351/159.1, 159.6, 159.68
See application file for complete search history.

(56) References Cited

U.S. PATENT DOCUMENTS

| | | |
|---|---|---|
| 2001/0006430 A1 | 7/2001 | Ikai et al. |
| 2003/0052838 A1 | 3/2003 | Kim et al. |
| 2004/0061920 A1 | 4/2004 | Tonar et al. |
| 2004/0218247 A1 | 11/2004 | Tonar et al. |
| 2006/0256071 A1 | 11/2006 | Kim et al. |
| 2008/0151350 A1 | 6/2008 | Tonar et al. |
| 2008/0278793 A1 | 11/2008 | Tonar et al. |
| 2008/0291523 A1 | 11/2008 | Tonar et al. |
| 2009/0095408 A1 | 4/2009 | LeCompte et al. |
| 2010/0246017 A1 | 9/2010 | Tonar et al. |
| 2013/0278989 A1 | 10/2013 | Lam et al. |
| 2015/0355519 A1* | 12/2015 | Vasiliev ............ B29D 11/00634 359/266 |
| 2016/0085131 A1 | 3/2016 | Lam et al. |
| 2016/0282694 A1 | 9/2016 | Biver et al. |

* cited by examiner

OPHTHALMIC DEVICE COMPRISING AN ELECTROCHROMIC CELL

The invention relates to an ophthalmic device comprising an electrochromic cell and to a process for assembling such a cell.

An electrochromic cell typically has a structure comprising two flat transparent outer layers, for example two surfaces made of organic or mineral material, on which transparent electrically conductive coatings are deposited on the inner faces thereof. An electrochromic composition fills a cavity formed between the two electrically conductive coatings. It is thus possible to vary the light transmission value of the cell by applying an electric field between the electrically conductive coatings.

The support of the two transparent outer layers and the sealing of the cavity is achieved by means of a peripheral seal.

It is known to use a seal that has a large width in order to ensure a satisfactory support of the two transparent layers together and also a sufficient stiffness of the electrochromic cell.

However, a peripheral seal of large width may prove problematic in the case of an ophthalmic device, this risking leading to a reduction in the effective field of the cell and to degrading the visual comfort of the wearer.

In order to ensure a constant spacing between the two transparent outer layers, it is also known to place spacing elements at the center of the cavity. These spacing elements then come into contact with the two outer layers and thus make it possible to maintain a stable thickness between the two outer layers forming the cavity of the cell.

However, such spacing elements may be visible by the wearer of the device, and in particular lead to the appearance of white spots or scattering spots in the middle of the cell which may prove to be particularly unattractive, when their size is greater than a few micrometers, and may hamper the vision of the wearer.

The invention aims to at least partially resolve the drawbacks disclosed above and, more particularly, aims to obtain an electrochromic cell having a good mechanical strength and comprising in particular a seal of narrow width.

Thus, the present invention relates to an ophthalmic device comprising an electrochromic cell comprising at least two transparent layers having curved inner faces that delimit between them a sealed cavity filled by an electrochromic composition, the cavity being delimited at the periphery by a seal formed from a crosslinked adhesive material, the seal being suitable for supporting the two transparent layers assembled with one another.

Such a cell formed from transparent layers having curved, and not flat, inner faces has a better stiffness and makes it possible to better adapt to the shapes of a frame in which the cell 3 may be mounted. The electrochromic cell is thus sufficiently solid while using a seal of controlled width. It is also possible to avoid placing spacing elements at the center of the cell.

This also makes possible to guarantee the leaktightness of the cavity filled with the electrochromic composition.

According to one embodiment, the transparent layers are ophthalmic lenses that meet, with the electrochromic composition of the cavity, an ophthalmic prescription of a wearer of the device.

According to one embodiment, the seal has a height of between 40 micrometers and 200 micrometers.

According to one embodiment, the seal is made with a cationically initiated epoxy resin.

According to one embodiment, the seal contains spacing elements suitable for ensuring a gap between the two transparent layers assembled by the seal and forming the cavity.

According to one embodiment, the cavity has a constant thickness between the two inner faces of the transparent layers.

According to one embodiment, the cavity has a variable thickness between the two inner faces of the transparent layers. This makes it possible to achieve a transmission gradient within the cell or to compensate for a low conductivity on the part of the electrically conductive coatings.

According to one embodiment, the inner faces of the transparent layers are each completely covered by a conductive coating.

According to one embodiment, the conductive coating of each of the inner faces is made of indium tin oxide (ITO).

According to one embodiment, a connecting element is positioned at the periphery all around each of the transparent layers and electrically connected to each of the conductive coatings, the seal being positioned so as to isolate each of the connecting elements from the cavity in a leaktight manner.

According to one embodiment, the device comprises a control circuit positioned between the connecting elements and electrically connected to each of the connecting elements, the seal being positioned so as to isolate the control circuit from the cavity in a leaktight manner.

According to one embodiment, the device comprises a conductive intermediate element comprising a first end positioned at the periphery of the cell and electrically connected to each of the connecting elements, the conductive intermediate element comprising a second end electrically connected to a control circuit, the seal being positioned so as to isolate the conductive intermediate element and the cavity in a leaktight manner.

The invention also relates to a process for assembling an electrochromic cell of an ophthalmic device, comprising two transparent layers, the transparent layers comprising curved inner faces that delimit between them a sealed cavity intended to be filled by an electrochromic composition, the cavity being delimited at the periphery by a seal formed from an adhesive material, the seal being suitable for supporting the two transparent layers assembled with one another, the process comprising the steps consisting in depositing an adhesive material on the periphery of the inner face of one of the transparent layers, assembling the inner faces of the two transparent layers by means of a support device so as to form the cavity; and crosslinking the adhesive material by an exposure to light treatment and/or by a heat treatment in order to form the seal.

According to one embodiment, the exposure to light treatment is a visible or ultraviolet light treatment.

According to one embodiment, in the deposition step, the adhesive material is deposited partially on the periphery of the inner face of one of the transparent layers so as to form, once the inner faces of the two transparent layers are assembled, at least one filling opening in the adhesive material that opens into the cavity; after assembling the inner faces of the two transparent layers, the cavity is filled with the electrochromic composition through the filling opening; after filling, the filling opening is plugged then covered with the adhesive material forming the seal.

Other features and advantages of the present invention will become apparent in the following detailed description, which refers to the appended drawings, in which.

It should be noted that, in the figures, the structural and/or functional elements common to the various embodiments may have the same references. Thus, unless otherwise mentioned, such elements have identical structural, dimensional and material properties.

For the sake of clarity, only the elements useful for understanding the embodiments described have been represented and will be described in detail.

Figure 1:
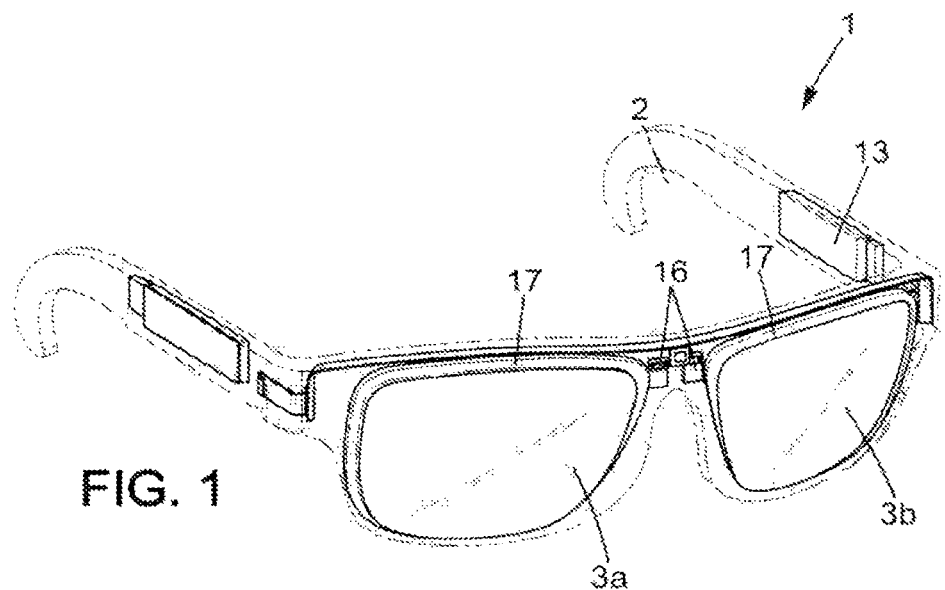
FIG. 1 is a perspective view of an ophthalmic device according to the invention.

FIG. 1 represents an ophthalmic device 1 according to the invention.

According to the embodiment represented in FIG. 1, the ophthalmic device 1 comprises a frame 2 in which two electrochromic cells 3a, 3b are mounted.

Figure 2A:
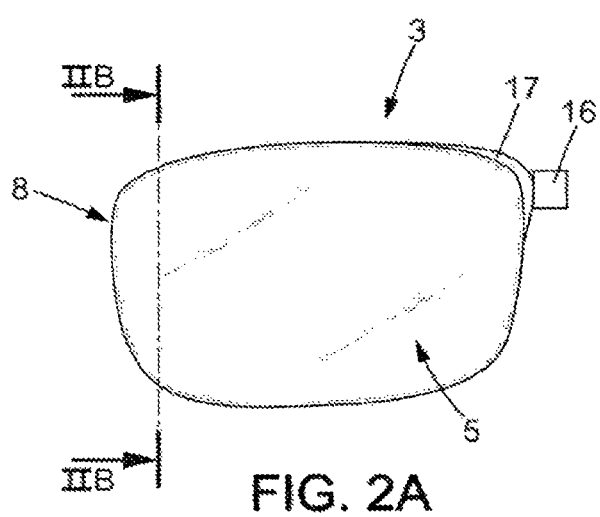
FIG. 2A is a front view of an electrochromic cell from FIG. 1.
Figure 2B:
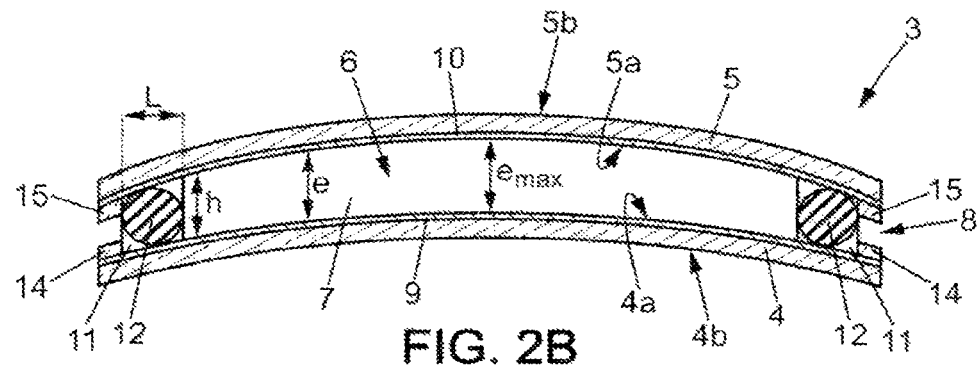
FIG. 2B is a schematic cross-sectional view in the plane IIB-IIB of FIG. 2A.

As represented in FIG. 2B, an electrochromic cell 3 comprises two transparent layers 4, 5, that are advantageously not conductive, delimiting between them a cavity 6 intended to be filled by an electrochromic composition 7. The electrochromic composition may for example be a solution comprising a solvent such as propylene carbonate, a thickener such as polymethyl methacrylate, oxidizing agents such as 1,1'-bis(3-(tert-butyl)phenyl)[4,4'-bipyridine]-1,1'-diium bis(tetrafluoroborate) and 1,1'-bis(3-(tert-butyl)phenyl)-[4,4'-bipyridine]-1,1'-diium bis(tetrafluoroborate), a reducing agent such as 10-methylphenothiazine (MePhtz) and an electrolyte such as tetra-n-butylammonium tetrafluoroborate (TBA $BF_4^-$).

Thus, each transparent layer 4, 5 comprises an inner face 4a, 5a and an outer face 4b, 5b. Thus, the term "inner" more particularly denotes the faces 4a, 5a delimiting the cavity 6 of the cell 3, and the term "outer" more particularly denotes the faces 4b, 5b outside the cavity 6. The cavity 6 thus has a thickness e between the two inner faces 4a, 5a.

The transparent layers 4, 5 may be layers made of organic or mineral material. The transparent layers 4, 5 may also be chosen to filter the ultraviolet radiation, in particular to absorb wavelengths below 420 nm for example. Generally, the material of the transparent layers 4, 5, or the treatment of the inner 4a, 5a and/or outer 4b, 5b faces thereof may enable the transparent layers 4, 5 to have advantageous features, such as enabling colored reflections, a mirror effect, protection with respect to blue light or protection with respect to infrared radiation, without this list being limiting. According to one embodiment, the transparent layers 4, 5 may be colored, photochromic or/and polarized. According to one embodiment, the transparent layers 4, 5 may be made of a tempered material so as to increase the mechanical strength thereof.

Preferably, the transparent layers 4, 5 have a thickness of between 50 micrometers and 2000 micrometers, or even between 300 micrometers and 1000 micrometers.

The transparent layers 4, 5 may for example be spherical shells, and have in particular a spheroid or ovoid shape delimited by a peripheral edge 8. In particular, the transparent layers 4, 5 are preferably ophthalmic lenses that meet, with the electrochromic composition 7 of the cavity 6, an ophthalmic prescription of a wearer of the ophthalmic device 1.

According to the invention, at least one inner face 4a, 5a, in particular both inner faces 4a, 5a, of the transparent layers 4, 5 are curved, that is to say that they have a non-zero curvature. For example, the inner faces 4a, 5a of the transparent layers 4, 5 may each be concave or convex. Moreover, the outer faces 4b, 5b of the transparent layers 4, 5 may also be curved, and in particular be concave or convex.

The inner face 4a, 5a of each of the transparent layers 4, 5 is at least partially, and preferably completely, covered by an electrically conductive coating 9, 10. The electrically conductive coating 9, 10 may for example be formed of an organic or mineral transparent conductive material, for example a transparent conductive oxide (TCO). Preferably, indium tin oxide (ITO) is used. The electrically conductive coating 9, 10 may also be formed of an IMI (ITO, metal, ITO), GZO, AZO, FTO, SWNT (carbon nanotube), graphene, silver wire or PEDOT material.

The cell 3, and in particular the two transparent layers 4, 5, are held together by a peripheral seal 11. The seal 11 thus completely surrounds the cavity 6. The seal 11 makes it possible to ensure a sufficient thickness e of the cell 3, and also a lack of direct contact between the electrically conductive coatings 9, 10 of each of the transparent layers 4, 5.

The seal 11 has a height h, in particular after assembling the cell 3, between a few tens of micrometers and a few hundreds of micrometers, preferably between 40 micrometers and 200 micrometers, or even more specifically between 80 micrometers and 160 micrometers, or even more specifically still between 90 and 150 micrometers. By way of example, the height h of the seal 11 may be equal to around 110 micrometers. This height h corresponds to the thickness e of the cavity 6 in the vicinity of the peripheral edges 8 of the transparent layers 4, 5, in particular of the peripheral edges of the inner faces 4a, 5a.

More specifically, the height h of the seal 11 as represented in FIG. 2B corresponds to a seal 11 which is not deposited on connecting elements 9, 10 as will be described below. However, in one embodiment in which the seal 11 is deposited, in particular partially, on connecting elements 9, 10, the height h corresponds to the height of the seal 11 and to the height of the connecting elements 9, 10 taken together.

Moreover, the width L of the seal 11 is preferably less than 1000 micrometers, or even less than 800 micrometers. Thus, when the ophthalmic device is installed in a frame, the seal will not be visible and will not limit the visual field of the wearer or the useful area of the ophthalmic device.

The term "width" denotes the size of an element extending in a plane substantially parallel to the inner faces 4a, 5a of the transparent layers 4, 5. The term "height" or "thickness" denotes the size of an element extending in a direction substantially transverse to the inner faces 4a, 5a of the transparent layers 4, 5.

The seal 11 is made from an adhesive material 20 which maintains the cohesion between the two transparent layers 4, 5.

According to an embodiment, the adhesive material 20 may be an acrylate, methacrylate, cyanoacrylate, epoxide, polyurethane or silicone glue. Preferably, the adhesive material 20 is in particular a cationic epoxy, epoxy-amine, epoxy-anhydride or oxime silicone glue.

The adhesive material 20 is preferably a light- and/or thermally-polymerizable resin. The adhesive material 20 is in particular a cationically initiated epoxy resin. Such a resin may be crosslinked by exposure to light and/or by thermal heating as will be described subsequently. A filled epoxy resin, once crosslinked, makes it possible to obtain a seal 11 having a good mechanical strength. Moreover, the seal 11 thus obtained is watertight and airtight.

According to one embodiment, the adhesive material 20 is compatible, or inert, with respect to the electrochromic composition 7, that is to say does not induce a chemical interaction or a degradation of the electrochromic composition 7.

According to one embodiment, the adhesive material 20 comprises spacing elements 12, such as glass beads or polymer beads. The spacing elements 12 are electrically isollating. In particular, the spacing elements 12 of the adhesive material 20 are in contact with each of the inner faces 4a, 5a of the transparent layers. The spacing elements 12 thus make it possible to define and control the height h of the seal 11 and therefore to obtain a sufficient thickness e of the cavity 6.

According to one embodiment, the adhesive material 20 also comprises a thixotropic agent. Such a thixotropic agent makes it possible to optimize the shape of the seal 11 by controlling the amount of adhesive material 20 deposited on one of the transparent layers 4, 5.

The thixotropic agent makes it possible in particular to obtain a satisfactory ratio between the height h and the width L of the seal 11. It is thus possible to obtain a cavity 6 having a sufficient thickness e, while minimizing the width L of the seal 11. This makes it possible to avoid an edge effect, that is to say a local spreading of the adhesive material 20 during the deposition thereof on the transparent layer, which would lead to a significant increase in the width L of the seal 11. As represented for example in FIG. 2B, the seal extends perpendicularly to the inner faces 4a, 5a, of the transparent layers 4, 5.

Furthermore, the thixotropic agent makes it possible to deposit the seal on curved surfaces while controlling the ratio between the height h and the width L of the seal. Thus, the cross section of the seal (height h and width L) remains substantially constant, even if the seal is deposited along a complex line on a curved surface, since the control of the rheology of the seal prevents the latter from spreading or slumping and does not lead to leaktightness or esthetic defects.

The electrically conductive coatings 9, 10 of each of the transparent layers 4, 5 form electrodes which are not in direct contact with one another and are intended to be electrically connected to an external electrical source 13 such as a battery as represented in FIG. 1.

For this purpose, a connecting element 14, 15 (also referred to as a "bus"), that is in particular metallic may be deposited at the periphery of each of the transparent layers 4, 5 in direct contact with each conductive coating 9, 10. Each of the connecting elements 14, 15 partially, and in particular completely, surrounds each transparent layer 4, 5 at its peripheral edge 8 and in particular at the edge face of the cell 3. Each of the connecting elements 14, 15 is in particular positioned at the peripheral edge 8 of each of the transparent layers 4, 5, forming in particular an equipotential around each of the transparent layers 4, 5. The connecting elements 14, 15 are for example made of copper, of gold, of silver or of nickel. Preferably, the connecting elements 14, 15 are passivated so as not to interact with the electrochromic composition 7 and in order to prevent their corrosion.

Each of the connecting elements 14, 15 is positioned outside of the cavity 6 formed by the cell 3 and is not therefore in contact with the electrochromic composition 7 filling the cavity 6. As a variant, the seal 11 may cover, at least partially, the connecting elements 14, 15.

The seal 11 is positioned between the cavity 6 and each of the connecting elements 14, 15. In other words, the circumference of the seal 11 is smaller than the circumference of each connecting element 14, 15. Each of the connecting elements 14, 15 is thus isolated, in particular electrically isolated, from the electrochromic composition 7, in order to prevent any local malfunction of the cell 3.

Each connecting element 14, 15 preferably has a width of between 500 micrometers and 800 micrometers. Each connecting element 14, 15 additionally preferably has a height of between 0.5 micrometers and 30 micrometers, preferentially between 1 and 15 micrometers, more preferentially still between 1 and 5 micrometers. The total thickness of the two connecting elements 14, 15 is inevitably less than the thickness e of the cell 3, so that these two connecting elements 14 and 15 are not in contact with one another.

In order to ensure the electrical operation of the cell 3, each connecting element 14, 15 is electrically connected to a control circuit 16. The control circuit 16 is for example a miniaturized electronic control board equipped with a microcontroller that makes it possible to control the switching on, turning off and/or transmission level of the cell 3.

Figure 4:
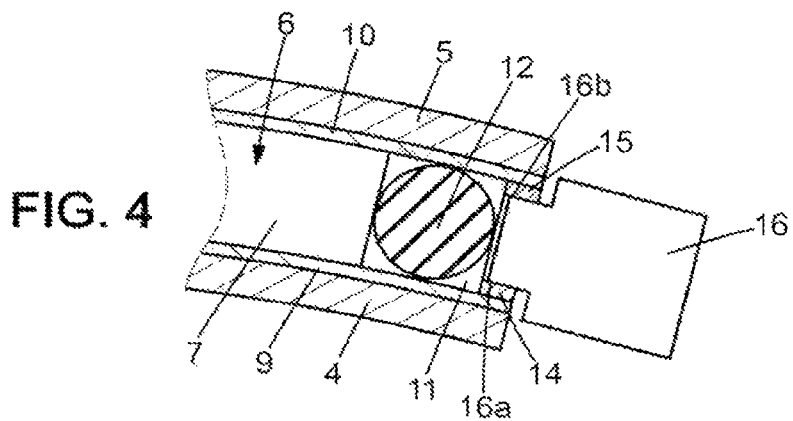
FIG. 4 is a schematic cross-sectional view of an electrochromic cell in which a control circuit is positioned directly between two connecting elements.

According to one embodiment represented for example in FIG. 4, the control circuit 16 is positioned directly between the two connecting elements 14, 15. The seal 11 is then not in contact with this control circuit 16 and does not interfere therewith. The control circuit 16 also comprises two faces 16a, 16b, each of the faces 16a, 16b being electrically connected, in particular in direct contact or with the aid of a conductive glue or a conductive adhesive, with a connecting element 14, 15. According to this embodiment, the height of the control circuit 16 between its two faces 16a, 16b is then equal to the thickness e of the cavity of the cell 3 minus the thickness of the connecting elements 14, 15.

Figure 3:
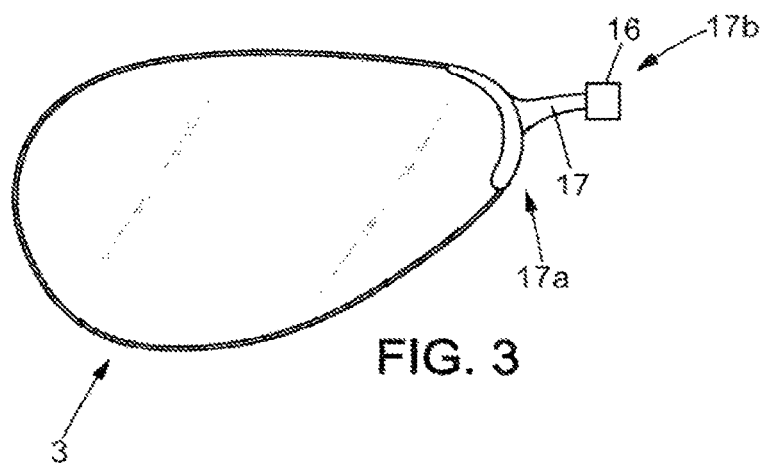
FIG. 3 is a front view of an electrochromic cell connected to a control circuit by a conductive intermediate element.

According to another embodiment as represented in FIG. 3, the control circuit 16 is not positioned directly between the two connecting elements 14, 15. The ophthalmic device 1 then comprises a conductive intermediate element 17 (also referred to as "flex"). The conductive intermediate element 17 is preferably positioned on the nasal or temporal side of the frame 2 of the ophthalmic device 1 as represented in FIG. 1.

According to this embodiment, the conductive intermediate element 17 is electrically connected at a first end 17a to each of the connecting elements 14, 15 independently. The conductive intermediate element 17 may be in contact with a relatively extensive surface of each of the connecting elements 9, 10. According to this embodiment, the conductive intermediate element 17 may for example partially adopt the shape of the peripheral edge 8 of the transparent layers 4, 5 in order to facilitate the assembling thereof with the cell 3.

The conductive intermediate element 17 may thus partially or completely surround the peripheral edge 8 of each of the transparent layers 4, 5. According to this embodiment in which the conductive intermediate element 17 completely surrounds the peripheral edges 8 of the transparent layers 4, 5, it is not then necessary for the cell 3 to comprise connecting elements 14, 15, the conductive intermediate element 17 acting as connecting elements 14, 15.

Thus, as a variant, the cell 3 may not comprise connecting elements 14, 15, especially when the coatings 9, 10 described above are made from a sufficiently conductive material.

The conductive intermediate element 17 is also electrically connected at a second end 17b to the control circuit 16 to enable the operation of the cell 3 to be controlled.

Figure 5:
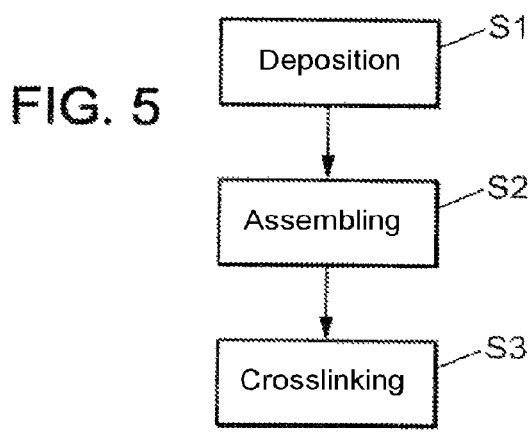
FIG. 5 is a schematic view of the various steps of the assembling process according to the invention.

The process for assembling a cell 3 according to the invention, represented schematically in FIG. 5, is described below.

Firstly, two transparent layers 4, 5 respectively covered on their inner faces 4a, 5a by an electrically conductive coating 9, 10 are provided.

The connecting elements 14 and 15 may also be deposited beforehand, for example by evaporation or by electroplating, on the transparent layers 4, 5, and in particular on the electrically conductive coatings 9, 10.

In a first deposition step S1, a crosslinkable adhesive material 20 is deposited on a transparent layer 4, in particular on the conductive coating 9 of its inner face 4a. The adhesive material 20 is deposited at the periphery of one of the transparent layers 4, 5, in particular in the vicinity of the peripheral edge 8 of one of the transparent layers 4, 5. The adhesive material 20, in particular the seal 11, is then not visible when the cell 3 is mounted in a frame, as represented in FIG. 1.

Figure 6:
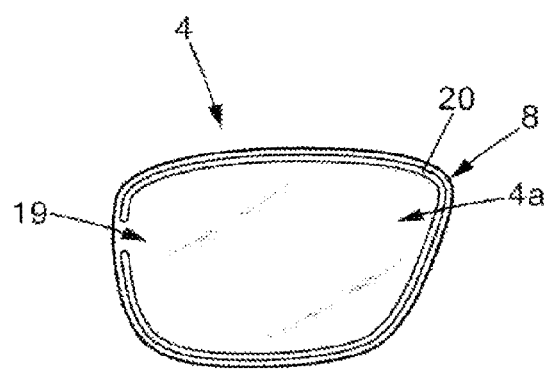
FIG. 6 is a schematic view of the adhesive material deposited on a transparent layer during the deposition step of the assembling process.

As represented in FIG. 6, the adhesive material 20 is more particularly deposited partially on the periphery of the inner face 4a of one of the transparent layers 4 so as to form, once the cell 3 is assembled, at least one filling opening 19 in the adhesive material 20 that opens into the cavity 6. The filling opening 19 is located at the periphery, and in particular on the edge face of the cell 3, in order not to affect the esthetic appeal of the device 1.

The adhesive material 20 is preferably deposited volumetrically, for example with a progressive cavity pump, such as a "Moineau" pump. The height h of the seal 11 being determined by the height of the spacing elements 12, it is possible to determine the width L of the seal 11 by controlling the volume of adhesive material 20 thus deposited and the relative rate of movement between the pump and the transparent layer 4 or 5 on which the adhesive material 20 is deposited.

According to one embodiment, the step S1 of depositing the adhesive material 20 is carried out automatically, for example by a multiaxial positioning system, in particular a 3-axis robot (not represented in the figures) which follows in particular the curvature of the surfaces, and in particular the curvature of the inner face 4a, 5a on which the adhesive material 20 is deposited.

The adhesive material 20 is preferably deposited on the conductive coating 9, 10 covering the inner face 4a, 5a of just one of the two transparent layers 4, 5. Alternatively, provision may be made to deposit the adhesive material 20 on each of the conductive coatings 9, 10 of the two transparent layers 4, 5.

Alternatively to the deposition step S1 described above, it is possible to use a film of filled adhesive resin, for example of filled epoxy resin, to deposit the adhesive material 20 on a transparent layer 4. The film is first cut to the correct geometry, in particular by a laser, in order to form a strip of adhesive material 20. The adhesive material 20 is then deposited precisely at the periphery of one of the transparent layers 4, 5, in particular in the vicinity of the peripheral edge 8 of one of the transparent layers 4, 5.

In a second assembling step S2, the two transparent layers 4, 5 are assembled, the inner faces 4a, 5a of the two transparent layers 4, 5 being positioned opposite one another in order to together form the cavity 6 intended to be filled with the electrochromic composition 7. This assembling step may be carried out manually or automatically.

During this assembling step S2, the conductive intermediate element 17 is provided in the cell 3 where necessary.

Figure 7:
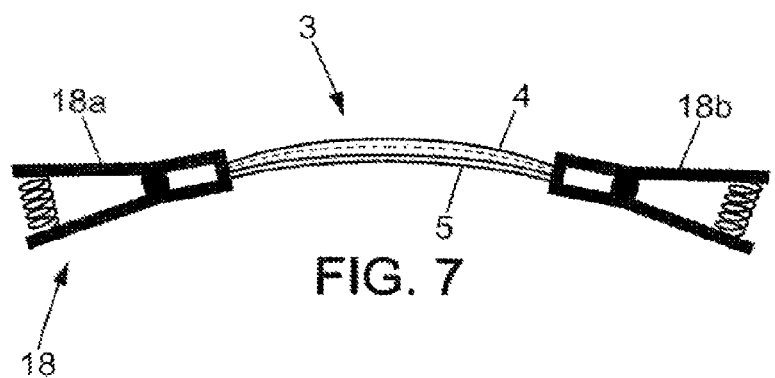
FIG. 7 is a side view of the two transparent layers supported by a support device during the assembling step of the assembling process.

As represented in FIG. 7, the cell 3 is then supported by a support device 18. By way of example, the support device 18 may comprise a plurality of seal clamps 18a, 18b in contact with the outer faces 4b, 5b of the two transparent layers 4, 5. It is also possible to use a completely spherical tool to provide a compressive stress between the two transparent layers 4, 5. Generally, it is possible to use any device that makes it possible to hold together two transparent layers 4, 5 thus assembled.

In a third crosslinking step S3, the adhesive material 20 is crosslinked.

In an initiation phase, the adhesive material 20 is firstly subjected to a light exposure treatment, or photon treatment. The adhesive material 20 is preferably subjected to an ultraviolet treatment. Alternatively, the adhesive material 20 is preferably subjected to a visible light treatment. The adhesive material 20 is then solidified, the spacing elements 12 then being fixed in the adhesive material 20. It is then possible to remove the support device 18.

In a propagation phase that follows the exposure to light of the adhesive material 20, the adhesive material 20 is also crosslinked by subjecting it to a heat treatment. For this purpose, the cell 3, advantageously supported by the support device 18, is placed in an oven, for example at a temperature between 60 and 180 degrees Celsius for a period of between a few minutes and a few hours, for example at 110 or 120 degrees Celsius for a period equal to around 30 or 60 minutes.

This step of crosslinking, by exposure to light then by heat treatment, makes it possible to prevent the appearance of an edge effect. Specifically, such edge effects would indeed be likely to appear if the adhesive material 20 was only subjected for example to a heat treatment.

The adhesive material 20 thus crosslinked forms the seal 11.

The cavity 6 is then filled with the electrochromic composition 7 through the filling opening 19 formed in the seal 11. The cavity 6 is filled by the electrochromic composition 7 for example by placing under vacuum, by capillary action or by injection. In the case of filling by capillary action or by injection, the adhesive material 20 then comprises at least two filling openings 19, in particular in order to enable the evacuation of air from the cavity 6 during the filling thereof.

After filling, the filling opening 19 is plugged back up with a glue, for example a one- or two-component silicone glue. The silicone glue is chosen to be inert with respect to the electrochromic composition.

An adhesive material 20 such as the one used to form the seal 11 is then preferably placed back over the silicone glue to ensure the leaktightness of the seal 11, in particular with respect to air. As a variant, an adhesive material different to the adhesive material 20 forming the peripheral seal 11 may also be used.

According to one variant, use is not made of a filling opening 19 formed in the seal 11 to fill the cavity 6. According to this variant, the cell 3 has been filled beforehand by a "one drop filling" process. According to this process, drops of electrochromic composition 7 of controlled volume are homogeneously distributed over the inner face 4a of the transparent layer 4 inside the cavity 6 prior to the assembling step S2 and after the step S1 of depositing the adhesive material 20. Thus, during the assembling, the cavity 6 of the cell 3 is already filled by the electrochromic composition 7.

The final assembled cell 3 is thus obtained.

Owing to the assembling process, a seal 11 is obtained that has a small enough width L so as not to enter the effective field of the cell and be visible by a user.

The height h of the seal 11 and therefore the thickness e of the cavity 6 may also be controlled.

The thickness e may in particular be constant throughout the cavity 6. As a variant, due to the different curvature of the inner faces 4a, 5a, the thickness e of the cavity 6 may also vary within the cavity 6. For example, the variation of the thickness e of the cavity 6 is less than 10% of the maximum thickness emax of the cavity 6 of the cell 3.

Thus, the thickness e of the cell 3 may for example be greater at the center of the cell 3 than at its periphery. It is then possible to compensate for a poor conductivity of the electrically conductive coatings 9, 10. According to another example, the thickness e of the cell 3 may vary in height in the cell 3 in order to produce a transmission gradient of the cell 3.

Obviously, the invention is not limited to the embodiments described above and provided solely by way of example. It encompasses various modifications, alternative forms and other variants that a person skilled in the art could envisage within the context of the present invention and in particular any combination of the various modes of operation described above, which can be taken separately or in combination.

The invention claimed is:

1. An ophthalmic device comprising:
an electrochromic cell including at least two transparent layers having curved inner faces that delimit between the at least two transparent layers a sealed cavity filled by an electrochromic composition, the cavity being delimited at a periphery by a seal formed from an adhesive material, the seal having a width of less than 1000 micrometers and supporting the two transparent layers assembled with one another.

2. The device as claimed in claim 1, wherein the transparent layers are ophthalmic lenses that meet, with the electrochromic composition of the cavity, an ophthalmic prescription of a wearer of the device.

3. The device as claimed in claim 1, wherein a height of the seal is between 40 micrometers and 200 micrometers.

4. The device as claimed in claim 1, wherein the seal is made with a cationically initiated epoxy resin.

5. The device as claimed in claim 1, wherein the seal includes spacing elements configured to form a gap between the two transparent layers assembled by the seal and forming the cavity.

6. The device as claimed in claim 1, wherein the cavity has a constant thickness between the two inner faces of the transparent layers.

7. The device as claimed in claim 1, wherein the cavity has a variable thickness between the two inner faces of the transparent layers.

8. The device as claimed in claim 1, wherein each of the inner faces of the transparent layers are completely covered by a conductive coating.

9. The device as claimed in claim 8, wherein the conductive coating of each of the inner faces is made of indium tin oxide (ITO).

10. The device as claimed in claim 8, wherein a connecting element is positioned at a periphery of each of the transparent layers and electrically connected to each of the conductive coatings, the seal being configured to isolate each of the connecting elements from the cavity in a leaktight manner.

11. The device as claimed in claim 10, further comprising:
a control circuit positioned between the connecting elements and electrically connected to each of the connecting elements, the seal being configured to isolate the control circuit from the cavity in the leaktight manner.

12. The device as claimed in claim 10, further comprising:
a conductive intermediate element including a first end positioned at a periphery of the electrochromic cell and electrically connected to each of the connecting elements; and
a second end electrically connected to a control circuit, the seal being configured to isolate the conductive intermediate element from the cavity in the leaktight manner.

13. A process for assembling an electrochromic cell of an ophthalmic device including two transparent layers, the process comprising:
depositing an adhesive material on a periphery of a curved inner face of one of the transparent layers, the curved inner faces delimiting a sealed cavity filled by an electrochromic composition between the two transparent layers;
assembling the inner faces of the two transparent layers by a support device;
forming the cavity delimited at the periphery by a seal formed from an adhesive material;
crosslinking the adhesive material by an exposure to at least one of a light treatment and a heat treatment; and
forming the seal having a width of less than 1000 micrometers and supporting the two transparent layers assembled with one another.

14. The assembling process as claimed in claim 13, wherein the exposure to the light treatment is a visible or an ultraviolet light treatment.

15. The assembling process as claimed in claim 13, wherein
in the deposition the adhesive material is deposited partially on the periphery of the inner face of one of the transparent layers forming at least one filling opening in the adhesive material that opens into the cavity when the inner faces of the two transparent layers are assembled,
after the assembling, the cavity is filled with the electrochromic composition through the at least one filling opening, and
after the cavity is filled, the filling opening is plugged covered with the adhesive material forming the seal.

* * * * *